United States Patent [19]
Okabe et al.

[11] Patent Number: 5,567,395
[45] Date of Patent: Oct. 22, 1996

[54] CATALYST CARRIER FOR A CATALYTIC CONVERTER FOR PURIFYING AN EXHAUST GAS IN AN INTERNAL COMBUSTION ENGINE

[75] Inventors: Shinichi Okabe, Nishio; Tohru Yoshinaga, Okazaki; Kiyohiko Watanabe, Okazaki; Yasuyuki Kawabe, Okazaki, all of Japan

[73] Assignee: Nippon Soken, Inc., Japan

[21] Appl. No.: 425,720

[22] Filed: Apr. 20, 1995

[30] Foreign Application Priority Data

Apr. 21, 1994 [JP] Japan .................................. 6-083470

[51] Int. Cl.$^6$ .................................................. B01D 53/34
[52] U.S. Cl. ..................... 422/180; 422/177; 422/211; 422/222; 502/527
[58] Field of Search ................................ 422/180, 177, 422/211, 222; 60/299; 502/439, 527; 428/593, 594, 116

[56] References Cited

U.S. PATENT DOCUMENTS

| | | | |
|---|---|---|---|
| 4,152,302 | 5/1979 | Nonnenmann et al. | 502/527 |
| 4,162,993 | 7/1979 | Retallick | 502/527 |
| 4,273,681 | 6/1981 | Nonnenmann | 502/527 |
| 4,987,034 | 1/1991 | Hitachi et al. | 422/180 |
| 5,278,125 | 1/1994 | Iida et al. | 502/439 |
| 5,456,890 | 10/1995 | Tsai et al. | 422/174 |
| 5,468,455 | 11/1995 | Bruck | 422/180 |

FOREIGN PATENT DOCUMENTS

9312880  7/1993  WIPO.

*Primary Examiner*—Robert J. Warden
*Assistant Examiner*—Hien Tran
*Attorney, Agent, or Firm*—Cushman Darby & Cushman, LLP

[57] ABSTRACT

A flat-corrugated combined sheet 16 is obtained from a flat sheet 10 and corrugated sheets 12 and 14 which are welded together. The combined sheet 16 is rolled, so that a catalyst carrier 18 of a honeycomb structure to which an exhaust gas is contacted is obtained. At a middle part of the catalyst carrier 18, the flat sheet 10 has a section 10-1 free of corrugated sheet, and is formed with louvers 21, so that, in the rolled state, a turbulence generating section 30 is created. At a location upstream from the turbulence generating section 30, the flat sheet 10 has spaced sections 10-2 free of corrugated sheet, so that, in the rolled state, low flow-resistance sections 22 are created. The dissipation of heat of the exhaust gas is reduced at the sections 22, so that the temperature of the exhaust gas introduced into the turbulence generating section 30 at locations downstream from the low flow-resistance sections 22 is high, thereby promoting an activation of the catalyst at the section 30.

6 Claims, 7 Drawing Sheets

CATALYST CARRIER FOR A CATALYTIC CONVERTER FOR PURIFYING AN EXHAUST GAS IN AN INTERNAL COMBUSTION ENGINE

BACKGROUND OF THE INVENTION

1. Field of the Invention

The present invention relates to a catalyst carrier for a catalytic convertor for purifying an exhaust gas from an internal combustion engine.

2. Description of Related Art

In a conventional catalytic convertor for an internal combustion engine, a catalyst carrier is constructed from a flat metal sheet and a corrugated metal sheet, which are rolled together with their surfaces facing each other so as to form a catalyst carrier of a honeycomb structure. In this construction of the carrier, an improvement for enhancing the exhaust gas purification performance is proposed, wherein the catalyst carrier has, at a middle portion along the length thereof, a means for generation of a turbulent flow of an exhaust gas flowing into the catalyst carrier. Such a turbulent flow allows increased speed in the flow of the exhaust gas, and a higher temperature of the exhaust gas to be maintained so that activation of in middle portion of the catalyst is accelerated. As a result, the commencement of purification of the exhaust gas by the catalyst at the turbulence generator takes place sooner after the engine is started. The heat generated by the reaction at the turbulence generator (a middle part of the catalyst carrier) can enhance activation of the entire catalyst carrier.

In the prior art construction of the carrier, introduction of exhaust gas to a turbulence generator takes place after the exhaust gas passes through a portion of the honeycomb structure located upstream from the turbulence generator whereat the speed of the exhaust gas is slowed down. As a result, a substantial part of a heat carried by the exhaust gas is dissipated prior to the arrival of the exhaust gas at the turbulence generator in the middle part of the catalyst carrier. As a result, the temperature of the exhaust gas at the turbulence generator is low, and, therefore, the speed of activation of the catalyst at the turbulence generator is decreased. In order to suppress the temperature drop of the exhaust gas introduced into the turbulence generator, the turbulence generator can be located nearer to the inlet of the catalyst carrier. However, this solution reduces the length of the honeycomb structure at the inlet end of the catalyst carrier, thereby reducing the mechanical strength of the catalyst carrier.

SUMMARY OF THE INVENTION

An object of the present invention is to provide a catalyst carrier with an increased speed of activation, while maintaining a desired mechanical strength.

The present invention provides a catalyst carrier of a honeycomb structure, of a cylindrical shape, having axially spaced inlet and outlet ends, comprising:

flat and corrugated thin metal sheets which extend axially and which are alternately arranged along a radial direction of the carrier;

said catalyst carrier having a turbulence generating section which is spaced from the inlet and outlet ends, the turbulence generating section extending along a partial length of the carrier, while extending substantially along the entire cross section of the carrier;

said catalyst carrier having low flow-resistance sections located upstream from the turbulence generating section while the low resistance sections are, in the cross section, arranged locally.

DESCRIPTION OF THE PREFERRED EMBODIMENTS

Figure 1:
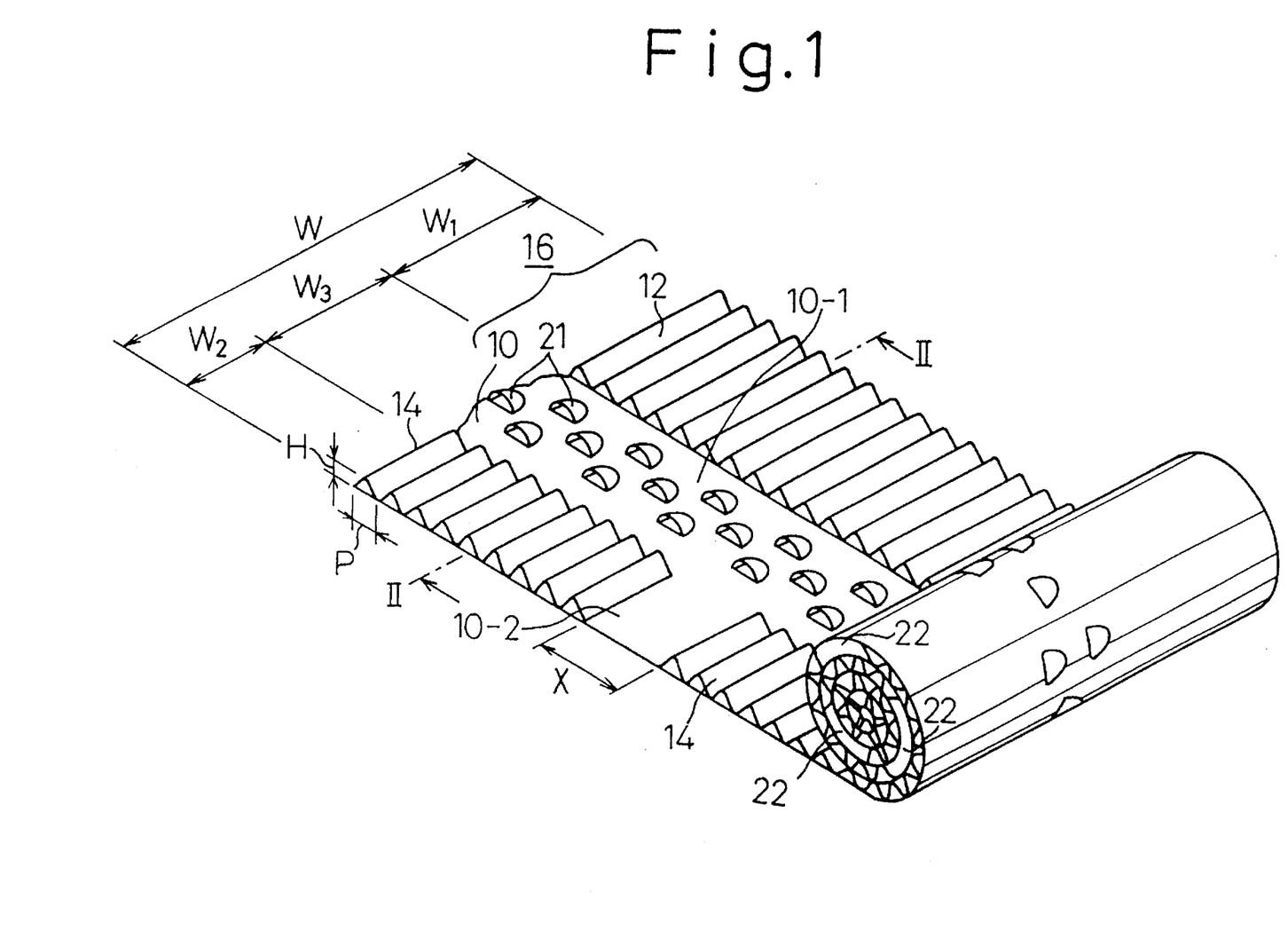
FIG. 1 is a perspective view of a catalyst carrier according to the present invention when it is rolled.
Figure 2:
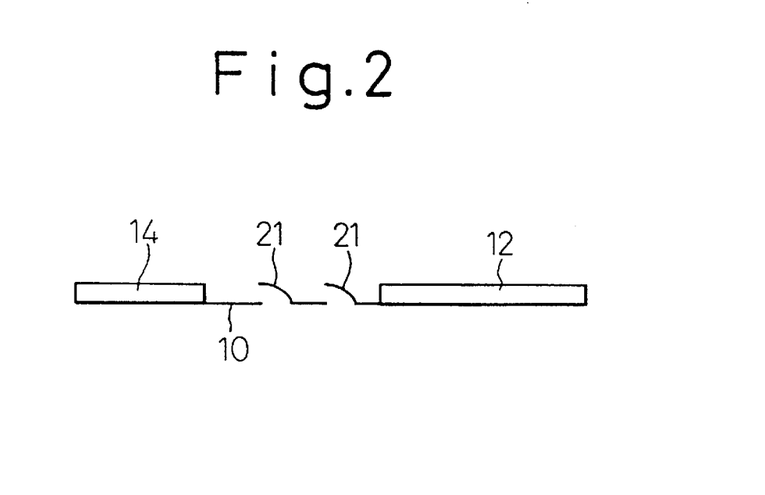
FIG. 2 is a transverse cross-sectional view taken along line II—II in FIG. 1.
Figure 3:
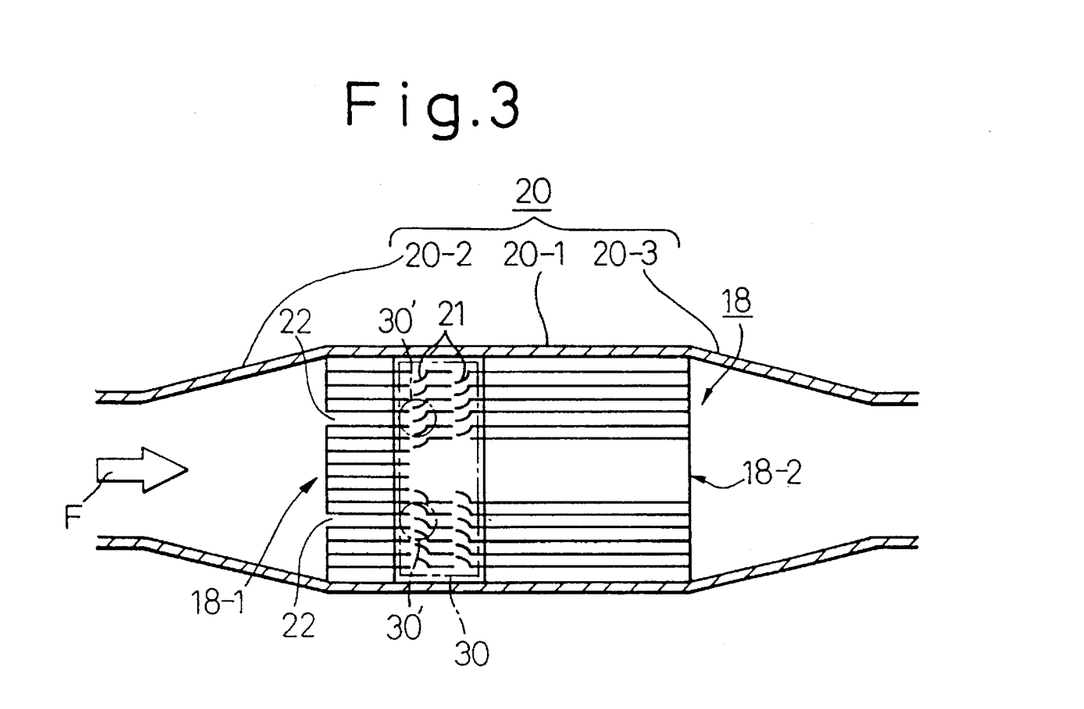
FIG. 3 is longitudinal cross-sectional view of the catalyst carrier in FIG. 1.

As shown in FIG. 1, reference numeral 10 denotes a flat thin metal sheet, on which corrugated sheets 12 and 14 are welded to create a flat-corrugated combined sheet 16, which is rolled, thereby obtaining a catalyst carrier 18 (FIG. 3) of a honeycomb structure having an upstream end 18-1 and a downstream end 18-2. The catalyst carrier 18 is housed in a metal casing 20 having a central portion 20-1 and inlet and outlet conical portions 20-2 and 20-3. Namely, the catalyst carrier 18 is located in the central portion 20-1 of the casing 20, wherein the upstream end 18-1 of the catalyst carrier 18 is opened to the inlet portion 20-2 of the casing 20 while the downstream end 18-2 of the catalyst carrier 18 is opened to the outlet portion 20-3 of the casing 20.

As shown in FIG. 1, the corrugated sheet 12 is continuous along the entire length of the sheet 10 and has a width $W_1$ smaller than the width W of the flat sheet 10. The continuous corrugated sheet 12 is arranged on one end portion of the sheet 10, so that sheets 10 and 12 are flush with each other at their longitudinal edges, which, when the combined sheet 16 is rolled to form the body 18, corresponds to the downstream end 18-2 of the catalyst carrier 18. A plurality of the corrugated sheets 14 of a width $W_2$ smaller than W, the width of the sheet 10, are arranged on the other end portion of the flat sheet along the entire length of the sheet 10, so that the sheets 10 and 14 are flush with each other at their longitudinal edges, which correspond to the upstream end 18-1 of the catalyst carrier 18. Thus, the sheet 10 has, on the upstream side, between the adjacent corrugated sheets 14, a section 10-2 of a length X free of corrugated sheets 14. The corrugated sheets 12 and 14 are formed with alternate valleys and crests, with the distance between adjacent valleys or crests (defined as the pitch P) of 2.5 mm and a height H (the distance from the top of a crest to the bottom of a valley) of 1.3 mm. The corrugated sheets 12 and 14 contact, at their valleys or crests, the flat sheet 10, and these sheets 10, 12 and 14 are, at their mutual contact points, welded to each other.

As shown in FIG. 1, the width W of the flat sheet 10 is larger than the sum of the widths $W_1 + W_2$ of the corrugated sheets 12 and 14, so that the flat sheet 10 has a middle section 10-1 of a width $W_3$ with no corrugated sheets 12 and 14 along the entire length of the sheet 10. After the formation of the catalyst carrier 18 is completed, the middle section 10-1 is located nearer to the upstream end 18-1 than to the downstream end 18-2, in the direction of the flow of the exhaust gas in the catalyst carrier as shown by the arrow F. As shown in FIG. 1, in the middle section 10-1, the flat sheet 10 is formed with a plurality of louvers 21. Each of the louvers 21 is constructed from a portion of the flat sheet 10 raised from the plane of the sheet 10, so that its height substantially corresponds to the height H of the crests of the corrugated sheet 12, so that an opening is formed on one side of the raised portion along the length of the sheet 10, on the side faced with the corrugated sheets 14. Namely, after the flat-corrugated combined sheet 16 is rolled to form the catalyst carrier 18, the louvers 21 open to the upstream end 18-1 in the direction of the flow of the exhaust gas F, while the raised portions of the sheet 10 forming the louvers 21 are directed radially inwardly. The section 10-1 with the louvers 21 functions to generate turbulence in the flow of the exhaust gas introduced into the catalyst carrier 18. In order to form the louvers 21, slits of a predetermined length are, first, formed in the flat sheet 10 so that they are distributed along the entire area of the section 10-1, and stamping is then carried out adjacent to the slits so that the stamped portions are raised, while the openings are created at the locations corresponding to the slits. The section 10-1 which has no corrugated sheet, and includes the louvers 21 forms a turbulent flow generator 30 (FIG. 3) when the construct is rolled to form the body 18.

Along the entire length of the sheet 10, about 60 of the sections 10-2 with no corrugated plates are evenly distributed. In the rolled state of the flat-corrugated combined sheet 16 to construct the catalyst carrier 18, each of the sections 10-2 forms, in a plane transverse to the axis of the body 18, an arc shape extending circumferentially for a limited angle, while extending axially for a length corresponding to the width $W_2$. These sections 10-2 are, in the plane transverse to the axis of the body 18, evenly distributed. In other words, at the inlet side of the catalyst carrier 18 in the direction of the flow of the exhaust gas as shown by the arrow F, a plurality of the sections 10-2 is arranged, each extending axially for a length ($W_2$), and each extending circumferentially for a length (X), while the sections 10-2 are, in the plane transverse to the axis, evenly distributed. At the sections 10-2 in the rolled body 18, the effective flow area is increased, i.e., flow resistance is reduced for the exhaust gas introduced into the body 18 from the inlet end 18-1. Thus, the section 10-2 after rolling to form the catalyst carrier 18, forms a low flow-resistance section 22.

As is well known, the catalyst carrier 18 made of metal carries, on its entire surface, a coating of a catalyst, which when it comes into contact with an exhaust gas from an internal combustion engine (not shown), which is active for HC and CO components in the exhaust gas.

How, an operation of the catalytic convertor provided with a catalyst carrier according to the present invention will be explained. When the engine is started, exhaust gas at high temperatures flows into the body 18 via the inlet 18-1 as shown by the arrow F. The exhaust gas then passes through a honeycomb structure formed by the flat sheet 10 and the corrugated sheets 14. Then, the exhaust gas passes through the turbulent flow section 30 constructed by the louvers 21. Namely, the flow of the exhaust gas is partly deflected by the louvers 21, thereby disturbing the flow of the exhaust gas. The gas is then introduced into the honeycomb structure formed by the flat sheet 10 and the corrugated sheet 12 located downstream from the turbulence generator 30. The exhaust gas is finally discharged from the body 18 at the end 18-2.

Prior to starting the internal combustion engine, the catalyst carrier 18 is in a cold condition. Thus, when the engine is started the exhaust gas at high temperatures comes into contact with and the surface of the honeycomb structure of the catalyst carrier 18, and heat of the exhaust gas is dissipated to the catalyst carrier 18. However, at the low flow resistance portions 22 adjacent the inlet end 18-1, the flow resistance of the exhaust gas is small due to the absence of corrugated plates. As a result, the amount of heat dissipated is small for the exhaust gas passing through the low flow resistance portions 22, so that the temperature of the exhaust gas flowing into the turbulence generating section 30 via the portions 22 is high. As a result, activation of the catalyst at the location of the turbulence generating section 30 is promoted, thereby quickly increasing the temperature at that location, which accelerates the propagation of the activated area of the catalyst to the entire area of the carrier. As a result, an increased speed of activation can be obtained.

Now, a mechanism for activating the catalyst will be explained. As explained above, the provision of the turbulent flow generating section 30 generates turbulence in the flow of the exhaust gas, which allows the temperature of the exhaust gas to be quickly increased, which accelerates the activation of the catalyst. As a result of a study by the inventors as to how the activation of the catalyst occurs at the turbulence generating section 30, it was found that the progress of the activation does not occur evenly and gradually along the entire region of the catalyst. Rather, the activation initially commences at a localized position, and then propagates over the entire catalyst. Namely, the localized activation of the catalyst allows the exhaust gas to be purified by an oxidation or a reduction reaction. The resultant reaction heat increases the temperature near the originally activated location. As a result, the activated region propagates rapidly.

Due to the provision of the low flow resistance portions 22 according to the present invention, the dissipation of the heat of the exhaust gas is reduced when the exhaust gas flows through the sections 22, so that, at locations 30' (FIG. 3) of the turbulence generating section 30 downstream from the low flow-resistance sections 22, the temperature of the exhaust gas remains high. As a result, at the locations 30' of the turbulent flow generating section 30, a rapid increase in the temperature of the exhaust gas is obtained, thereby promoting, locally, the activation of the catalyst. As a result, a rapid activation of the entire area of the turbulence generator 30, as well as the entire are of the catalyst carrier 18, becomes possible.

Figure 4A:
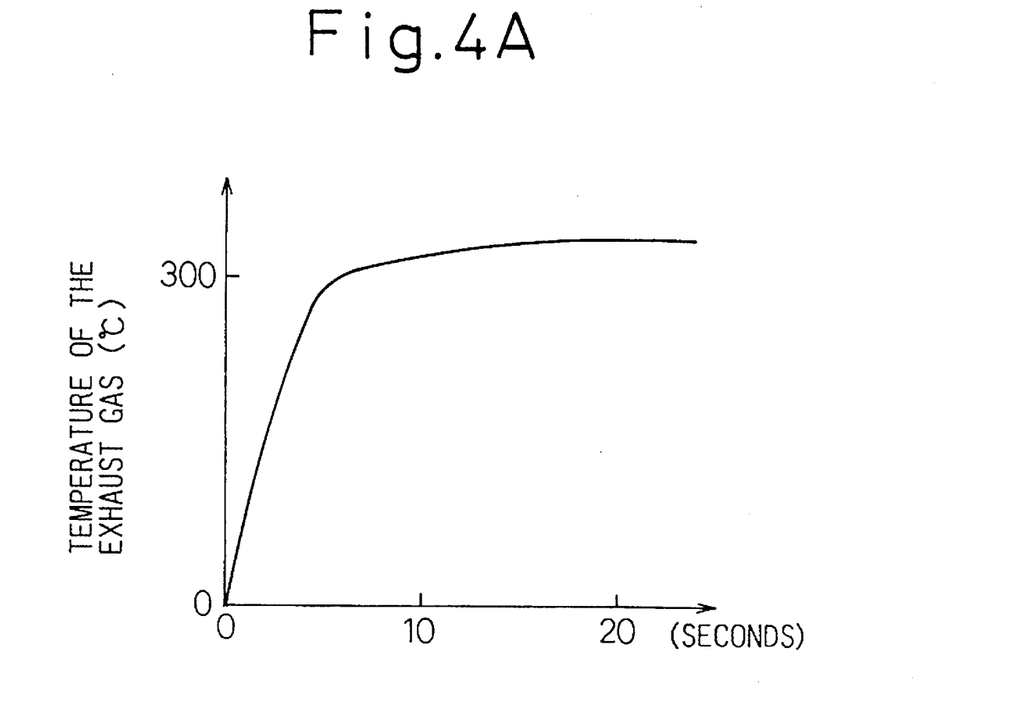
FIG. 4A shows the relationship between the time after starting an internal combustion engine and the temperature of the exhaust gas in the catalytic converter.
Figure 4B:
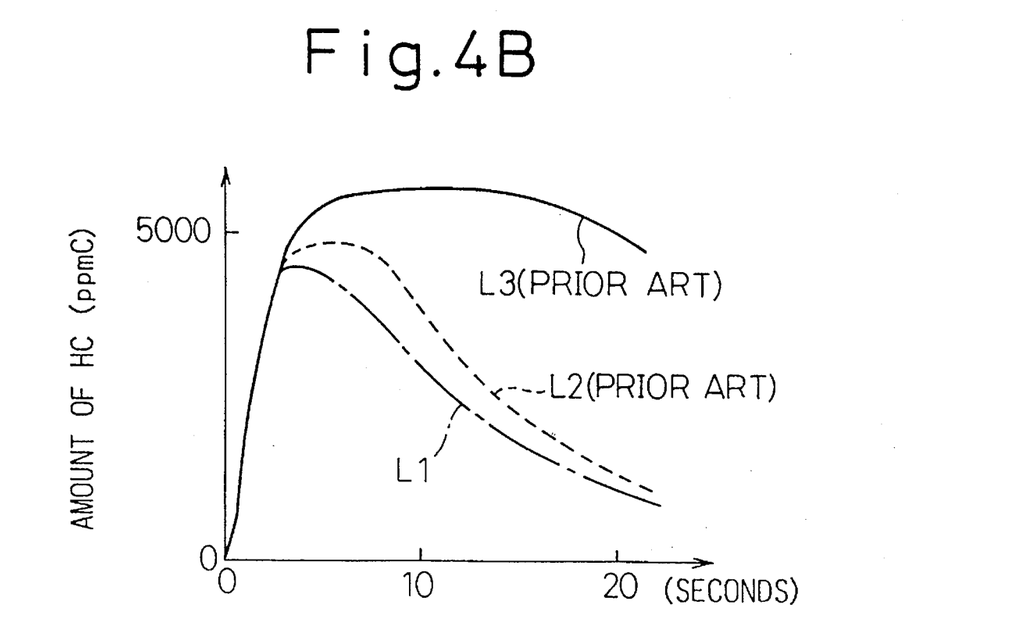
FIG. 4B shows the relationship between the time after starting an internal combustion engine and the amount of HC in an exhaust gas.
Figure 9:
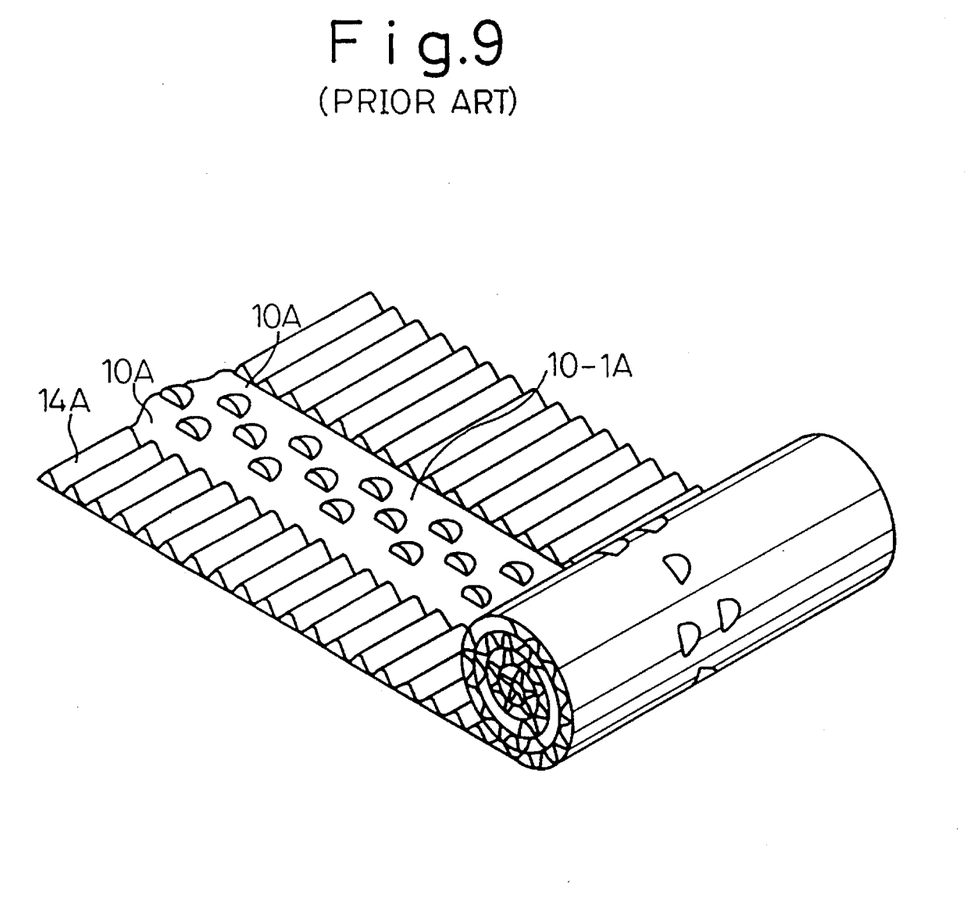
FIG. 9 is similar to FIG. 1 but illustrates a construction of a prior art.

FIG. 4A shows the relationship between the time after the commencement of the introduction of the exhaust gas due to the starting of an internal combustion engine and the temperature of the exhaust gas at the inlet end 18-1 of the catalyst carrier 18. FIG. 4B shows the relationship between the time and the amount of hydrocarbon (HC) components in the exhaust gas as discharged. In FIG. 4B, curve L1 corresponds to a catalyst carrier with the low flow-resistance sections 22 upstream from the turbulence generating section 30, according to the present invention. Curve L2 corresponds to a catalyst carrier of the prior art with the turbulence generating section without the low flow-resistance section as shown in FIG. 9. Curve L3 corresponds to a catalyst carrier of the prior art without the turbulence generating section.

As will be understood from FIG. 4B, an increased exhaust gas purification performance (L1) can be obtained according to the present invention over the performance (L2) of the prior art where the turbulence generating section is provided without providing low flow-resistance sections, or the performance (L3) of the prior art where the turbulence generating section is not provided.

In short, according to the first embodiment, at the side of the flat sheet 10, corresponding to the inlet of the catalyst carrier 18, the corrugated sheet is segmented, so that it is absent at the sections 10-2, thereby reducing the flow resistance at these sections. The dissipation of heat from the exhaust gas at the low flow-resistance sections is lower than that at the remaining portions of the inlet of the carrier, so that the temperature of the exhaust gas introduced into locations of the turbulence generating section 30 downstream from the low flow-resistance sections 22 remains high. As a result, activation of the catalyst is promoted at these locations, from where propagation of the activated area quickly commences. Thus, activation of the entire catalyst carrier is accelerated.

The solution of the first embodiment is advantageous in its simple construction; the mere elimination of the corrugated plate 14 at the spaced sections 10-2 of the flat sheet 10 is sufficient to obtain the desired effect.

In the prior art, as shown in FIG. 9, a corrugated plate 14A is arranged along the entire length of the flat sheet 10A. In other words, no provision is made as to the sections 10-2 of the flat sheet 10 with no corrugated sheets, as is the case in the present invention in FIG. 1. As a result, when the engine is started, the exhaust gas is subjected to a temperature decrease at every portion of the inlet of the carrier, and is introduced into the turbulent section obtained by the middle section 10-1A. Thus, activation of the catalyst at the turbulent section is delayed.

Figure 5:
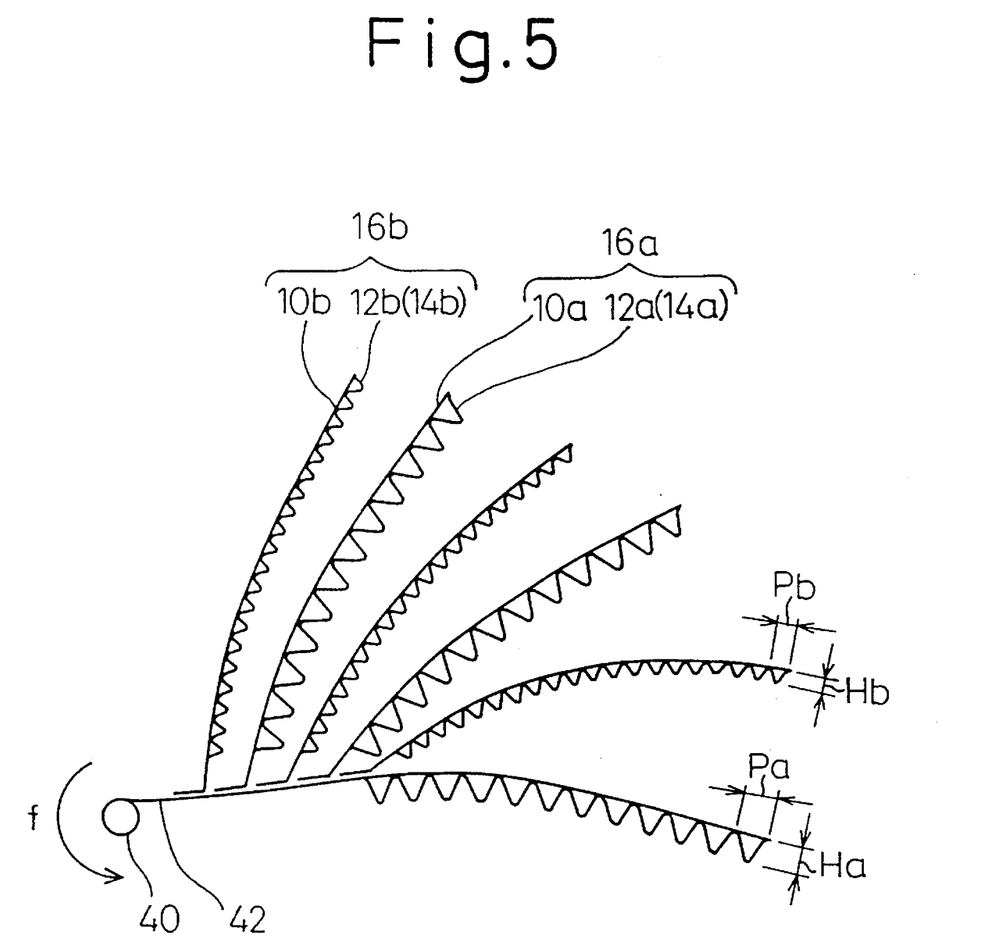
FIG. 5 shows a schematic side view of a catalyst carrier of the second embodiment before it is rolled.
Figure 8:
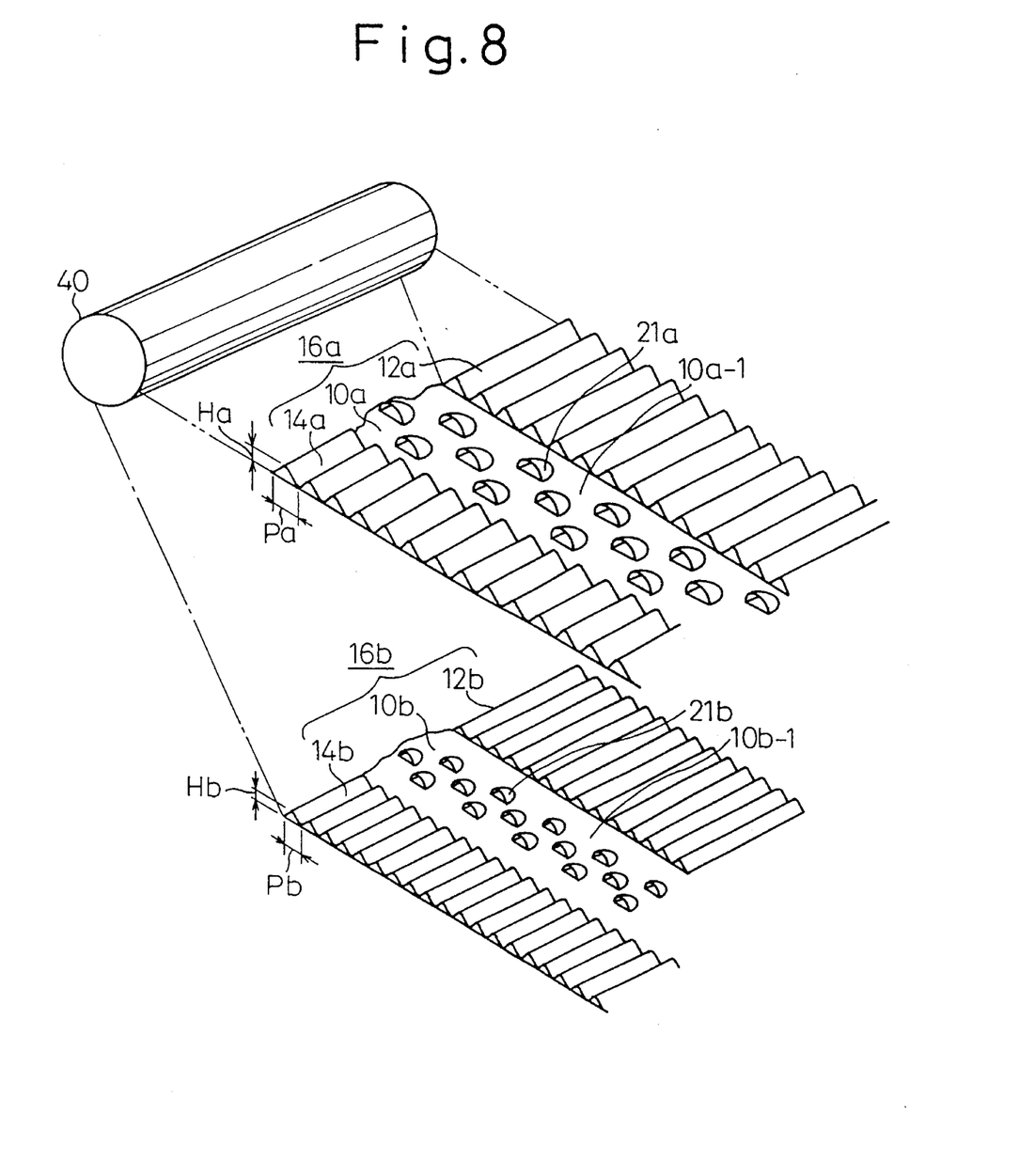
FIG. 8 shows a schematic perspective view of the catalyst carrier of the second embodiment before it is rolled.

FIGS. 5 to 8 show a second embodiment of the present invention. Namely, in the second embodiment, as shown in FIG. 5, two different kinds of flat-corrugated combined sheets 16a and 16b are provided. As shown in FIG. 8, the first flat-corrugated combined sheet 16a is constructed by a flat sheet 10a, a corrugated sheet 12a on one end portion of the sheet 10a along the length (downstream side in the rolled state), and a corrugated sheet 14a on the other end portion of the sheet 10a along the length. As with the first embodiment, the flat sheet has a middle section 10a-1 along the length of the flat sheet 10a, and the section 10a-1 is formed with a plurality of louvers 21a. The middle section 10a-1 with the louvers 21 is, in a rolled state, a turbulence generator as in the first embodiment. Unlike the first embodiment, the corrugated sheet 14a on the inlet side extends along the entire length. In other words, no section free of corrugated sheets is provided at the inlet side, contrary to the case in the first embodiment. The corrugated plates 12a and 14a have a pitch Pa larger than the pitch P of the first embodiment and a crest height Ha higher than the height H of the first embodiment.

Similarly, the second flat-corrugated combined sheets 16b is constructed by a flat sheet 10b, a corrugated sheet 12b on the downstream side, and a corrugated sheet 14b on the upstream side. The flat sheet 10b has a middle section 10b-1 with a plurality of louvers 21b for constructing a turbulence generator. As with the combined sheet 16a, the corrugated sheet 14b on the inlet side extends along the entire length. The corrugated plates 12b and 14b have a pitch Pb the same as that of the first embodiment and a height Hb the same as that of the first embodiment. The louvers 21b have the same height as the louvers 21a. The width of the corrugated sheet 12a is the same as that of the corrugated sheet 12b, while the width of the corrugated sheet 14a is the same as that of the corrugated sheet 14b.

Figure 6:
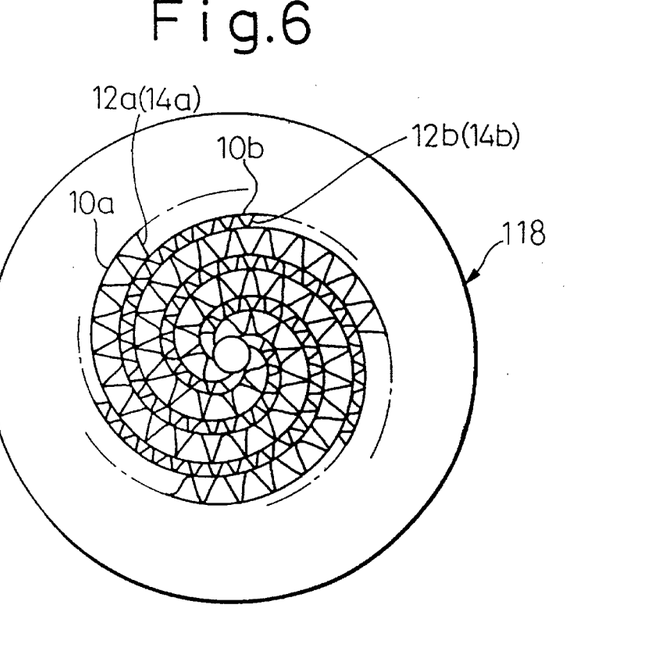
FIG. 6 shows a schematic transverse cross-sectional view of the catalyst carrier of the second embodiment.
Figure 7:
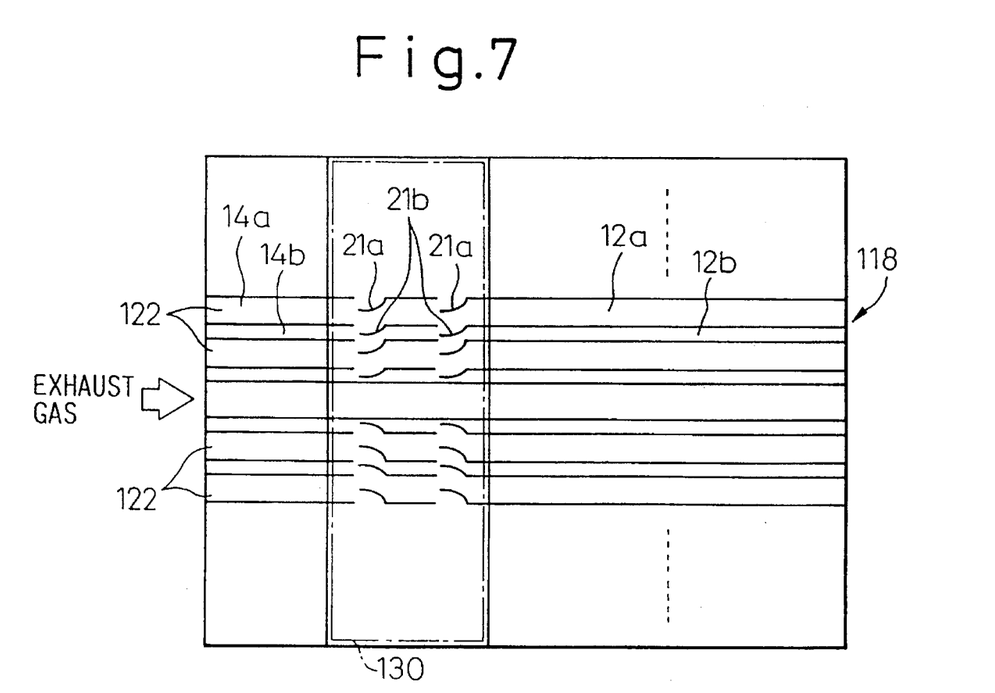
FIG. 7 shows a schematic longitudinal cross-sectional view of the catalyst carrier of the second embodiment.

In order to produce a carrier, as shown in FIG. 5, a flat plate 42 of a fixed length is fixed to a mandrel 40. A plurality of the flat-corrugated combined sheets 16a and 16b are arranged alternately. The ends of the sheets 16a and 16b are fixed to the flat sheet 42. Then, the sheet 42 together with the flat-corrugated combined sheets are rolled in a direction shown by the arrow f in FIG. 5 in order to obtain a catalyst carrier 118 as shown in FIG. 6. In this case, the catalyst carrier 118 is, at its middle portion along the length thereof, formed with a turbulence generating section 130, which is constructed by the middle section 10a-1 of the flat plate 10a with the louvers 21a and the middle section 10b-1 of the flat plate 10b with louvers 21b.

In short, in the second embodiment, two kind of the flat-corrugated combined sheet 16a and 16b, with different pitches Pa and Pb and crest heights Ha and Hb, which are alternately arranged along a radial direction, are provided. Furthermore, at the inlet and outlet sides along the length of the catalyst carrier 118, the flat-corrugated combined sheet 16a of a larger pitch and the flat-corrugated combined sheet 16b of a smaller pitch are alternately arranged along a radial direction. At the inlet end, the flat-corrugated combined sheet 16a of a larger pitch forms a low resistance section 122. Namely, when exhaust gas is introduced into the carrier, the flat-corrugated combined sheet 16a with a larger pitch has a flow area which is larger than that of the flat-corrugated combined sheet 16b with a smaller pitch. Thus, the flow resistance at the section 122 is lower than that of the other section.

In view of the above, in the second embodiment, a low flow resistance is obtained when the exhaust gas is passed through the sections 122 due to the fact the corrugated sheet 14a has an increased crest height and pitch, thereby reducing the dissipation of heat from the exhaust gas. As a result, the temperature of the exhaust gas introduced to the turbulence generating section 130 downstream from the section 122 is high, thereby promoting activation of the catalyst at these locations. Then, the local activation of the catalyst is rapidly propagated to the entire part of the turbulence generating section 130, thereby effectively purifying the exhaust gas.

The provision of low flow-resistance sections 122 by means of the corrugated sheets 14a located upstream of the turbulence generating section 130 in the second embodiment is advantageous in that the construction is simplified.

The present invention is not limited to the above embodiments. Namely, in place of the louvers, a meshed plate can be provided to obtain a turbulent flow of the exhaust gas at the turbulence generating section. Furthermore, in order to create the honeycomb structure of the catalyst carrier, in place of the roll of the flat-corrugated combined sheet, a laminated construction of flat sheets and corrugated sheets arranged alternately can be employed.

We claim:

1. A catalyst carrier comprising:

an assembly of flat and corrugated sheets, wherein a first corrugated sheet is disposed along an end portion of the flat sheet, along the entire length of the flat sheet, while on an other end portion of the flat sheet, a plurality of spaced second corrugated sheets are arranged along the flat sheet, so that the flat sheet has spaced sections with no corrugated sheet along the length of said flat sheet;

a mid-section of the flat sheet with no corrugated sheet being defined between the first corrugated sheet and the plurality of spaced second corrugated sheets, the mid-section extending along the entire length of the flat sheet, the mid-section being formed with a plurality of louvers distributed along the entire length of the mid-section;

the flat-corrugated sheet assembly being rolled to form a catalyst carrier of a cylindrical shape having axially spaced inlet and outlet ends;

in the catalyst carrier, the mid-section of the flat sheet with no corrugated sheet and with louvers defining a turbulence generating section;

in the catalyst carrier, said spaced sections with no corrugated sheet defining low flow-resistance sections located upstream from the turbulence generating section.

2. A catalyst carrier as in claim 1, further comprising a tubular casing having an inlet end for introducing an exhaust gas and an outlet end for discharging the exhaust gas;

the catalyst carrier being arranged in said casing at a location between the inlet and the outlet ends, the catalyst carrier including a catalyst; thereby to define a catalytic converter for an exhaust gas of an internal combustion engine.

3. A catalyst carrier comprising flat metal plates and corrugated metal plates, which are alternately face to face contacted so as to form a tubular honeycomb structure defining a plurality of first passageways for an exhaust gas located between the flat metal plates and corrugated metal plates, the honeycomb structure having an inlet end and an outlet end axially spaced from the inlet end, said first passageways extending axially from the inlet end, the honeycomb structure further comprising enlarged, second passageways arranged at the inlet end of the honeycomb structure, said second passageways being arranged in parallel to the first passageways in a direction of flow of the exhaust gas in the honeycomb structure, the parallel arrangement between the first and second passageways being such that a flow resistance when the exhaust gas passes through the second passageway is smaller than that when the exhaust gas passes through the first passageway, and wherein a turbulence generating section is defined between the inlet end and the outlet end of the honeycomb structure and in communication with each of the first passageways as well as each of the second passageways.

4. A catalyst carrier according to claim 3, wherein, at the inlet end of the honeycomb structure, spaced portions of the flat plates with no corrugated plates are provided, thereby creating said enlarged, second passageways of reduced flow resistance.

5. A catalyst carrier according to claim 3, wherein the corrugated plates comprise two kinds of corrugated plates, having corrugations of different heights and pitches that are alternately arranged, so that a flow passageway between one of the kinds of the corrugated plate is larger than that of the other kind of corrugated plate, thereby creating said enlarged, second passageways of reduced flow resistance.

6. A catalyst carrier according to claim 3, wherein the arrangement of the flat plates and the corrugated plates are such that said face to face contact between the flat plates and the corrugated plates occur only at areas corresponding to the inlet and outlet ends of the honeycomb structure, and wherein, at a location between said areas, only the flat plates are provided, the flat plates being formed at said location with a plurality of louvers for forming the turbulence generating sections.

\* \* \* \* \*